US010335948B2

(12) United States Patent
Suzuki et al.

(10) Patent No.: US 10,335,948 B2
(45) Date of Patent: Jul. 2, 2019

(54) ABNORMALITY DETERMINING DEVICE AND ABNORMALITY DETERMINING METHOD

(71) Applicant: TOYOTA JIDOSHA KABUSHIKI KAISHA, Toyota-shi, Aichi-ken (JP)

(72) Inventors: Tomohiro Suzuki, Nagakute (JP); Masanori Kokume, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 143 days.

(21) Appl. No.: 15/474,130

(22) Filed: Mar. 30, 2017

(65) Prior Publication Data

US 2017/0297199 A1      Oct. 19, 2017

(30) Foreign Application Priority Data

Apr. 18, 2016   (JP) .................. 2016-082762

(51) Int. Cl.
*B25J 9/04*     (2006.01)
*B25J 9/16*     (2006.01)
(Continued)

(52) U.S. Cl.
CPC ......... *B25J 9/1674* (2013.01); *G01M 13/021* (2013.01); *G01P 3/48* (2013.01);
(Continued)

(58) Field of Classification Search
CPC ...... B25J 9/1674; B25J 13/088; B25J 9/1694; B25J 9/1651; G05B 19/4065;
(Continued)

(56) References Cited

U.S. PATENT DOCUMENTS

| 5,566,092 | A  | 10/1996 | Wang et al. |
| 2005/0264251 | A1 | 12/2005 | Bischoff et al. |
| 2012/0065781 | A1 | 3/2012 | Ikeda et al. |

FOREIGN PATENT DOCUMENTS

| DE | 44 47 288 A1 | 7/1995 |
| EP | 1 600 833 A2 | 11/2005 |

(Continued)

OTHER PUBLICATIONS

Apr. 17, 2018 Partial Translation of Japanese Office Action issued in Japanese Patent Application No. 2016-082762.

*Primary Examiner* — Alesa Allgood
(74) *Attorney, Agent, or Firm* — Oliff PLC

(57) ABSTRACT

An abnormality determining device includes: a current value detecting unit configured to detect a current value which is a value of a drive current of a motor; a variance ratio calculating unit configured to group time-series current values detected in time series by the current value detecting unit at a predetermined time interval, to calculate a variance value of the current values of each group, and to calculate a variance ratio of each group by dividing the variance value of the current values of the corresponding group by a variance value of a reference current value of the motor when a reduction gear is normal; and a determination unit configured to determine that the reduction gear is abnormal when the variance ratios calculated by the variance ratio calculating unit for all the groups are equal to or greater than a threshold value.

4 Claims, 9 Drawing Sheets

(51) Int. Cl.
*G01M 13/021* (2019.01)
*G01P 3/48* (2006.01)
*G05B 19/4065* (2006.01)
*G05B 19/406* (2006.01)

(52) U.S. Cl.
CPC ....... *G05B 19/406* (2013.01); *G05B 19/4065* (2013.01); *G05B 2219/37209* (2013.01); *G05B 2219/37525* (2013.01)

(58) Field of Classification Search
CPC ........ G05B 2219/37525; G05B 19/406; G05B 2219/36495; G05B 2219/39261; G01P 3/48; Y10S 901/02; Y10S 901/46; Y10S 901/28; Y10S 901/01; Y10S 901/27; Y10S 901/15
See application file for complete search history.

(56) References Cited

FOREIGN PATENT DOCUMENTS

| | | | | |
|---|---|---|---|---|
| EP | 2 431 137 A2 | | 3/2012 | |
| JP | 2005-148873 A | | 6/2005 | |
| JP | 2005-186822 | * | 7/2005 | ................ B61L 5/10 |
| JP | 2005-186822 A | | 7/2005 | |
| JP | 2006-102889 | * | 4/2006 | .............. B25J 19/06 |
| JP | 2006-102889 A | | 4/2006 | |
| JP | 2012-061535 A | | 3/2012 | |
| JP | 2015-034776 A | | 2/2015 | |
| WO | WO 2009/096551 | * | 1/2009 | ............ G01M 13/04 |
| WO | 2009/096551 A1 | | 8/2009 | |

\* cited by examiner

FIG. 5

| ITEM | | GROUP | | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| ROTATION ANGLE | $\theta$ | $\theta_1$ | $\theta_2$ | $\theta_3$ | $\theta_4$ | $\theta_5$ | $\theta_6$ | $\theta_7$ | $\theta_8$ | $\theta_9$ | $\theta_{10}$ | $\theta_{11}$ | $\theta_{12}$ | $\theta_{13}$ | $\theta_{14}$ | $\theta_{15}$ | $\theta_{16}$ | $\theta_{17}$ | $\theta_{18}$ | $\theta_{19}$ |
| ROTATIONAL ANGULAR VELOCITY | $V$ | $V_1$ | $V_2$ | $V_3$ | $V_4$ | $V_5$ | $V_6$ | $V_7$ | $V_8$ | $V_9$ | $V_{10}$ | $V_{11}$ | $V_{12}$ | $V_{13}$ | $V_{14}$ | $V_{15}$ | $V_{16}$ | $V_{17}$ | $V_{18}$ | $V_{19}$ |
| ROTATIONAL ANGULAR ACCELERATION | $a$ | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ | $a_{17}$ | $a_{18}$ | $a_{19}$ |
| VARIANCE VALUE OF REFERENCE CURRENT VALUES | $\sigma^2$ | $\sigma_1^2$ | $\sigma_2^2$ | $\sigma_3^2$ | $\sigma_4^2$ | $\sigma_5^2$ | $\sigma_6^2$ | $\sigma_7^2$ | $\sigma_8^2$ | $\sigma_9^2$ | $\sigma_{10}^2$ | $\sigma_{11}^2$ | $\sigma_{12}^2$ | $\sigma_{13}^2$ | $\sigma_{14}^2$ | $\sigma_{15}^2$ | $\sigma_{16}^2$ | $\sigma_{17}^2$ | $\sigma_{18}^2$ | $\sigma_{19}^2$ |
| VARIANCE VALUE OF MOTOR CURRENT VALUES | $\sigma_N^2$ | $\sigma_{N1}^2$ | $\sigma_{N2}^2$ | $\sigma_{N3}^2$ | $\sigma_{N4}^2$ | $\sigma_{N5}^2$ | $\sigma_{N6}^2$ | $\sigma_{N7}^2$ | $\sigma_{N8}^2$ | $\sigma_{N9}^2$ | $\sigma_{N10}^2$ | $\sigma_{N11}^2$ | $\sigma_{N12}^2$ | $\sigma_{N13}^2$ | $\sigma_{N14}^2$ | $\sigma_{N15}^2$ | $\sigma_{N16}^2$ | $\sigma_{N17}^2$ | $\sigma_{N18}^2$ | $\sigma_{N19}^2$ |
| VARIANCE RATIO | $F = \dfrac{\sigma_N^2}{\sigma^2}$ | $F_1$ | $F_2$ | $F_3$ | $F_4$ | $F_5$ | $F_6$ | $F_7$ | $F_8$ | $F_9$ | $F_{10}$ | $F_{11}$ | $F_{12}$ | $F_{13}$ | $F_{14}$ | $F_{15}$ | $F_{16}$ | $F_{17}$ | $F_{18}$ | $F_{19}$ |

SECTION A | DIAGNOSIS SECTION | SECTION B | DIAGNOSIS SECTION | SECTION C | DIAGNOSIS SECTION | SECTION D

▨ : SECTION OTHER THAN OBJECT, etc.

ABNORMALITY DETERMINING DEVICE AND ABNORMALITY DETERMINING METHOD

INCORPORATION BY REFERENCE

The disclosure of Japanese Patent Application No. 2016-082762 filed on Apr. 18, 2016 including the specification, drawings and abstract is incorporated herein by reference in its entirety.

BACKGROUND

1. Technical Field

The disclosure relates to an abnormality determining device and an abnormality determining method for determining abnormality of a reduction gear of a motor for a robot.

2. Description of Related Art

An abnormality determining device that extracts a frequency component associated with rotation of a reduction gear of a motor for a robot, performs frequency analysis, and determines abnormality of the reduction gear is known (for example, see Japanese Patent Application Publication No. 2015-034776 (JP 2015-034776 A)).

As described above, when abnormality of a reduction gear is determined by frequency analysis, it is necessary to acquire data about rotation or the like in fine details with a very short cycle time (for example, about 0.1 to 1 ms). A high-performance and high-cost measuring device is required for the data acquisition. On the other hand, for example, a data acquisition cycle time of a measuring device disposed in a current robot or the like is about several tens of ms. Accordingly, when abnormality determination is performed using a technique such as the frequency analysis, it is necessary to add a high-cost measuring device or a high-cost computing device to the current robot.

SUMMARY

The disclosure is made in consideration of the above-mentioned problems and provides an abnormality determining device and an abnormality determining method that can accurately determine abnormality of a reduction gear of a motor for a robot.

According to a first aspect of the disclosure, there is provided an abnormality determining device that determines abnormality of a reduction gear of a motor for a robot, the abnormality determining device including: a current value detecting unit configured to detect a current value which is a value of a drive current of the motor; a variance ratio calculating unit configured to group time-series current values detected in time series by the current value detecting unit at a predetermined time interval, to calculate a variance value of the current values of each group, and to calculate a variance ratio of each group by dividing the variance value of the current values of a corresponding group by a variance value of a reference current value of the motor when the reduction gear is normal; and a determination unit configured to determine that the reduction gear is abnormal when the variance ratio calculated by the variance ratio calculating unit is equal to or greater than a threshold value. According to the first aspect, it is possible to accurately determine abnormality of a reduction gear of a motor for a robot without using a high-cost measuring device or a high-cost computing device. In the first aspect, the determination unit may calculate an abnormality ratio which is a ratio of the number of groups in which the variance ratio is equal to or greater than the threshold value to the number of groups which are arranged in time series as the groups and may determine that the reduction gear is abnormal when a calculated abnormality ratio is equal to or greater than a predetermined ratio. In the first aspect, the robot may include an angular velocity detecting unit configured to detect a rotational angular velocity of the motor, and the determination unit may calculate an average value of the rotational angular velocities corresponding to the current values of the motor in the groups on a basis of the rotational angular velocity of the motor detected by the angular velocity detecting unit, may exclude groups in which a calculated average value of the rotational angular velocities of the motor is equal to or less than a predetermined velocity from the groups which are arranged in time series as the groups, may calculate the abnormality ratio, and may determine that the reduction gear is abnormal when the calculated abnormality ratio is equal to or greater than the predetermined ratio. Accordingly, it is possible to accurately calculate the abnormal ratio by excluding the groups before and after the motor stops in which the motor current values have unevenness and to more accurately determine abnormality of the reduction gear using the abnormality ratio. In the first aspect, the robot may include an angular velocity detecting unit configured to detect a rotational angular velocity of the motor, and the determination unit may calculate a variation of the rotational angular velocities corresponding to the current values of the motor in the groups on a basis of the rotational angular velocity of the motor detected by the angular velocity detecting unit, may extract groups in which a calculated variation of the rotational angular velocities of the motor is equal to or less than a predetermined variation from the groups which are arranged in time series as the groups, may calculate the abnormality ratio using only the variance ratios of an extracted groups, and may determine that the reduction gear is abnormal when the calculated abnormality ratio is equal to or greater than the predetermined ratio. Accordingly, it is possible to accurately calculate the abnormality ratio using only groups in which the motor current values are stable and the rotational angular velocity of the motor is fixed or a variation thereof is equal to or less than a predetermined variation and to more accurately determine abnormality of the reduction gear using the abnormality ratio. In the first aspect, the robot may include a jointed arm having a joint, the motor may drive the joint via the reduction gear, the joint rotating in a pitch direction may be provided with a balancer configured to generate a balancing force for balancing with a gravitational moment acting on the joint, the robot may include an angle detecting unit configured to detect a rotation angle of the motor, and the determination unit may extract groups in which all the rotation angles corresponding to the current values belonging to each group and detected by the angle detecting unit are within a predetermined angle range centered on a neutral rotation angle at which the gravitational moment balances with the balancing force, may calculate the abnormality ratio using only the variance ratios of an extracted groups, and may determine that the reduction gear is abnormal when the calculated abnormality ratio is equal to or greater than a predetermined ratio. Accordingly, it is possible to accurately calculate the abnormality ratio using only the groups in which a rotating operation of the joint is unlikely to be affected by gravity, the motor current values are stable, and the rotation angles of the motor are within a predetermined angle range and to more accurately determine abnormality of the reduction gear using the abnormality ratio. In the first aspect, the abnormality determining device may further include a report unit configured to report an abnormality determination result to a user when the determination unit determines that the reduction gear is abnormal. Accordingly, the user can easily recognize abnormality of the reduction gear. According to a second aspect of the disclosure, there is provided an abnormality determining method of determining abnormality of a reduction gear of a motor for a robot, the abnormality determining method including: detecting a current value which is a value of a drive current of the motor; grouping a detected time-series current values at a predetermined time interval, calculating a variance value of the current values of each group, and calculating a variance ratio of the current values of each group by dividing the variance value of the current values of a corresponding group by a variance value of a reference current value of the motor when the reduction gear is normal; and determining that the reduction gear is abnormal when a calculated variance ratio is equal to or greater than a threshold value.

According to the disclosure, it is possible to provide an abnormality determining device and an abnormality determining method that can accurately determine abnormality of a reduction gear of a motor for a robot without using a high-cost measuring device or a high-cost computing device.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a diagram illustrating groups of the diagnosis section;

DETAILED DESCRIPTION OF EMBODIMENTS

Figure 1:
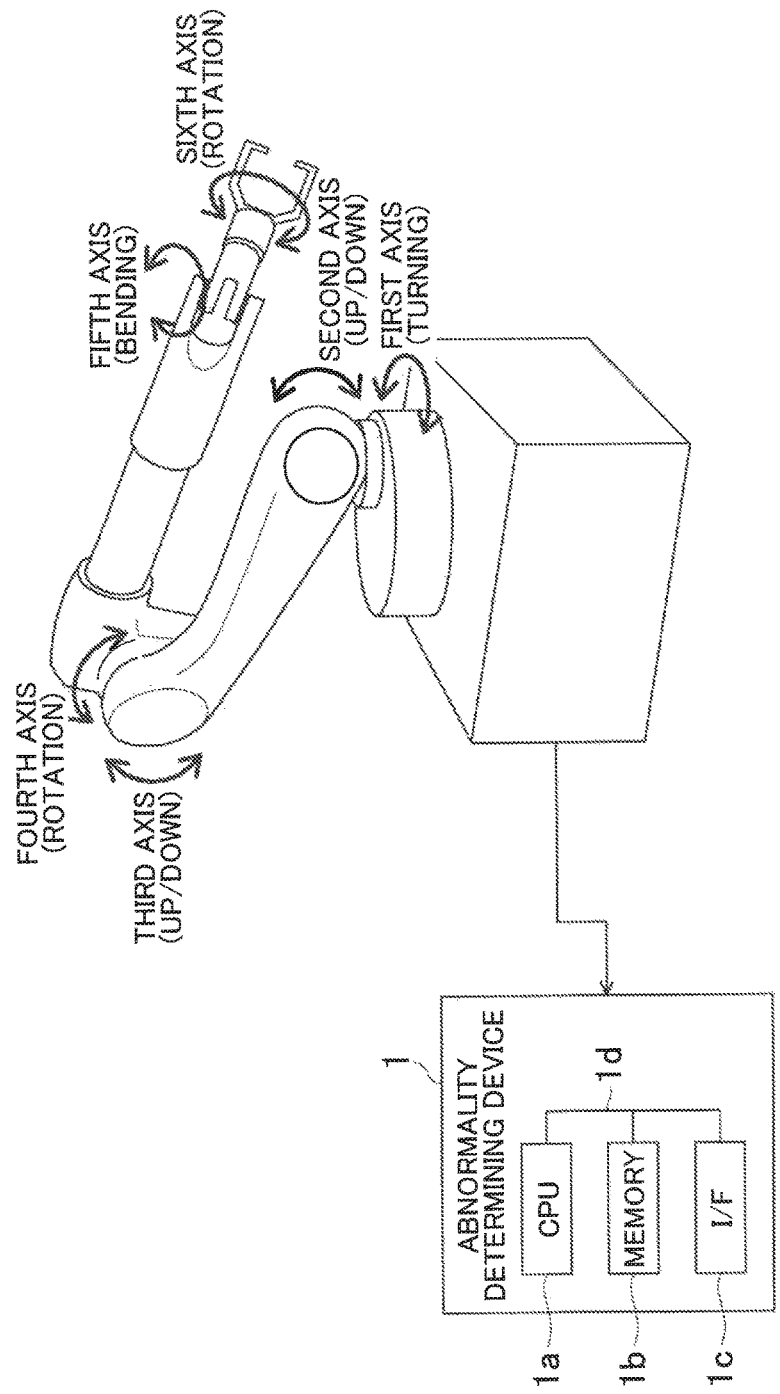
FIG. 1 is a diagram illustrating a robot and an abnormality determining device according to a first embodiment.
Figure 2:
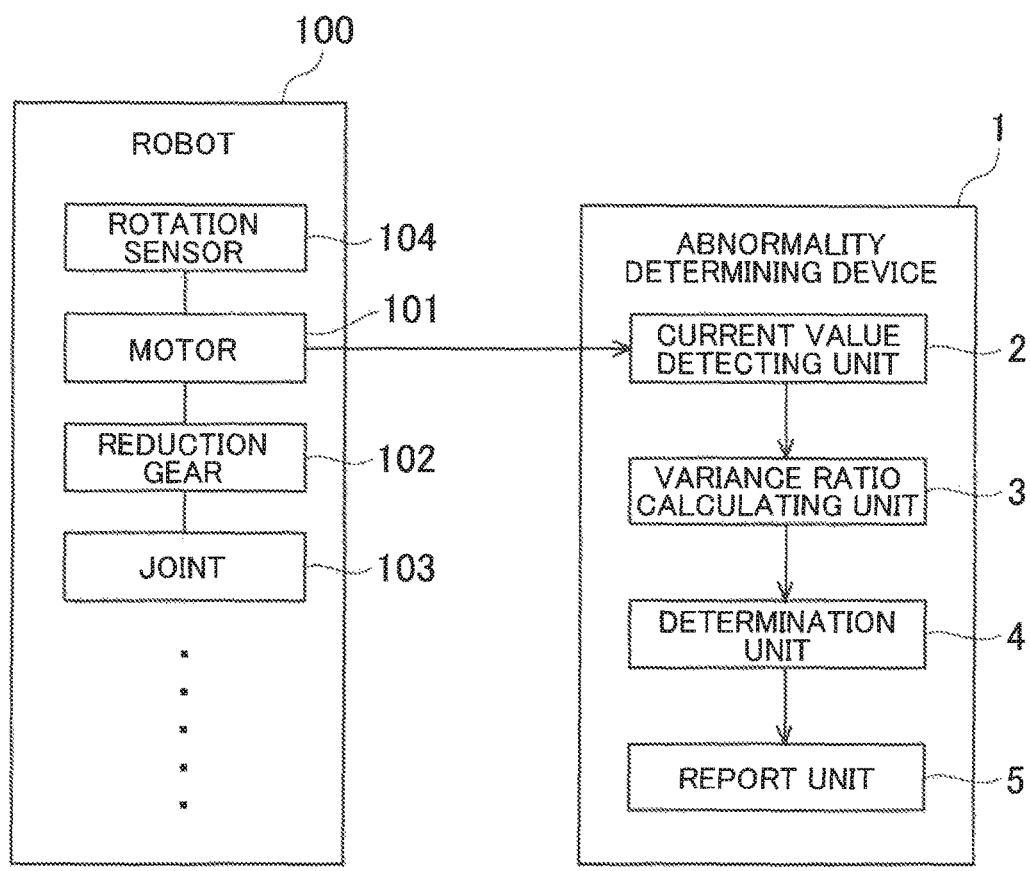
FIG. 2 is a block diagram illustrating a schematic system configuration of the abnormality determining device according to the first embodiment.

Hereinafter, embodiments of the disclosure will be described with reference to the accompanying drawings. FIG. 1 is a diagram illustrating a robot and an abnormality determining device according to a first embodiment. FIG. 2 is a block diagram illustrating a schematic system configuration of the abnormality determining device according to the first embodiment. The abnormality determining device 1 according to the first embodiment determines abnormality of a reduction gear 102 of a motor 101 for a robot. The robot 100 is, for example, a multi jointed arm having a plurality of joints (one axis to six axes) 103. Each joint 103 is provided with a motor 101 that drives the corresponding joint 103, a reduction gear 102 that reduces a rotation of a drive shaft of the motor 101 using a gear and transmits the reduced rotation to a drive shaft of the corresponding joint 103, and a rotation sensor 104 that detects rotation information (a rotation angle, a rotational angular velocity, or a rotational angular acceleration) of the drive shaft of the corresponding motor 101.

In car factories or the like, a plurality of robots, each of which is identical to the above-mentioned robot, operate to produce cars, and when a reduction gear of a motor for a robot becomes abnormal, a fabrication line may stop for a long time to cause a great loss. Therefore, conventionally, abnormality of a reduction gear is determined by frequency analysis of motor currents or the like, but in this case, it is necessary to acquire data in fine details with a very short cycle time. A high-performance and high-cost measuring device is required for the data acquisition. On the other hand, a data acquisition cycle time of a measuring device disposed in a current robot is about several tens of ms. Accordingly, when abnormality determination using a technique such as the frequency analysis is performed, it is necessary to add a high-cost measuring device or a high-cost computing device to the current robot. In this case, a large increase in costs is caused in a factory in which many robots are arranged.

On the other hand, the abnormality determining device 1 according to the first embodiment can accurately determine abnormality of the reduction gear 102 of the motor 101 for a robot without using a high-cost measuring device or a high-cost computing device by performing the determination using a statistical technique, for example, even when data is sparse (when a sampling cycle time is long) with a computing device of the current robot 100 or a simple measuring device built into the current robot 100. As described above, since abnormality determination of the reduction gear 102 can be performed with high accuracy using sparse data, it is possible to reduce an amount of data to be acquired and to decrease a memory capacity.

The abnormality determining device 1 according to the first embodiment includes a current value detecting unit 2 that detects a current value of the motor 101 for the robot 100, a variance ratio calculating unit 3 that groups time-series current values detected by the current value detecting unit 2 at a predetermined time interval and calculates a variance ratio (F value) by dividing a variance value of the current values in each group by a variance value of a reference current value, a determination unit 4 that determines abnormality of the reduction gear 102, and a report unit 5 that reports abnormality of the reduction gear 102 to a user.

The abnormality determining device 1 is constituted in hardware, for example, by a microcomputer including a central processing unit (CPU) 1a that performs a computing process or the like, a memory 1b including a read only memory (ROM) or random access memory (RAM) and of which a computing program executed by the CPU 1a is stored, and an interface unit (I/F) 1c that inputs and outputs a signal with respect to the outside. The CPU 1a, the memory 1b, and the interface unit 1c are connected to each other via a data bus 1d or the like.

The current value detecting unit 2 is a specific example of the current value detecting unit. The current value detecting unit 2 detects a current value (hereinafter referred to as a motor current value) for driving the motor 101 for the robot 100 using an ampere meter or the like. The current value detecting unit 2 samples the motor current value, for example, with a predetermined minute cycle time (about several tens of ms) and outputs the sampled motor current value to the variance ratio calculating unit 3.

Figure 3:
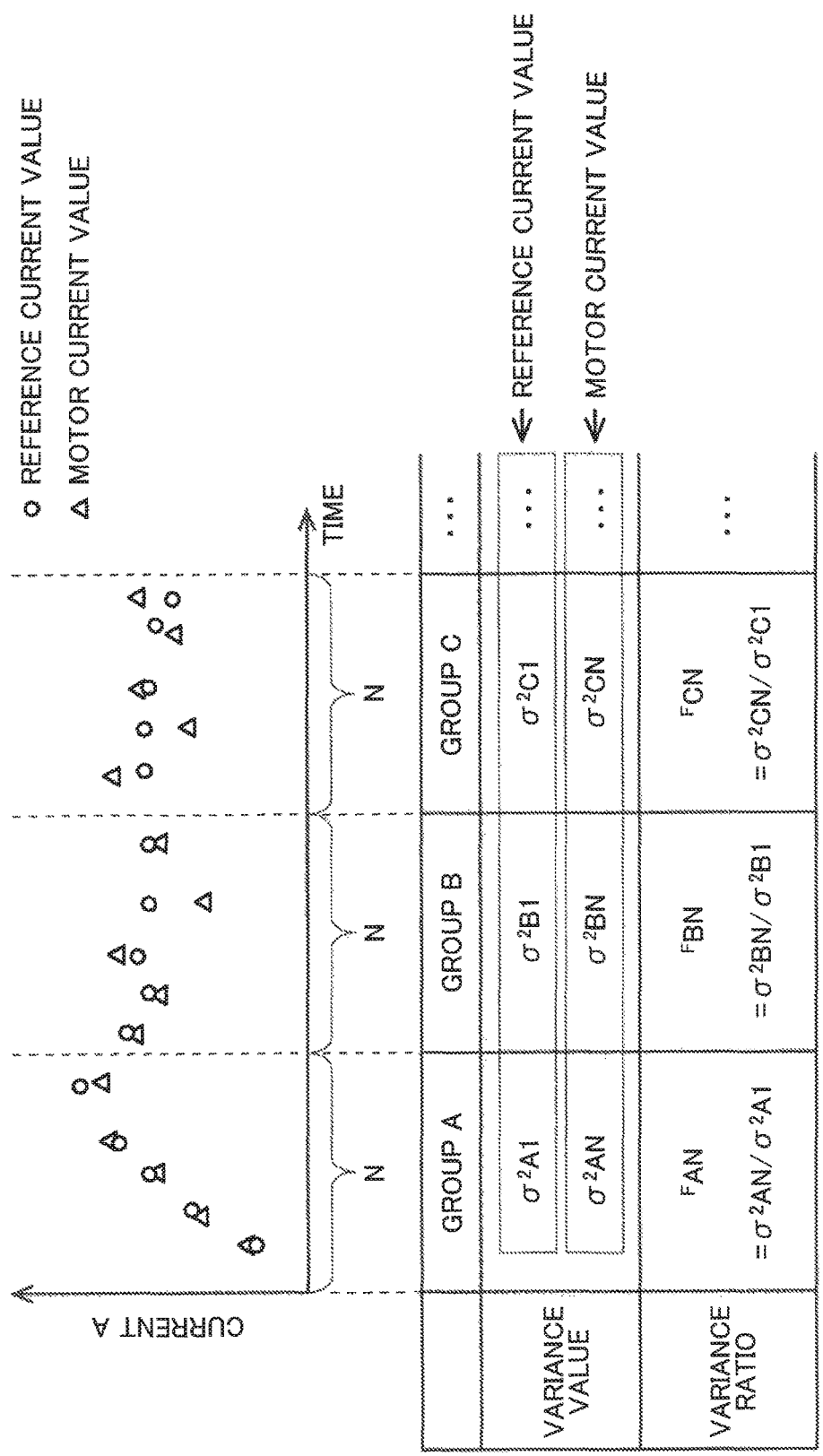
FIG. 3 is a diagram illustrating a variance ratio of each group.

The variance ratio calculating unit 3 is a specific example of the variance ratio calculating unit. The variance ratio calculating unit 3 groups the time-series motor current values detected in a time-series order by the current value detecting unit 2 at a predetermined time interval and calculates a variance value of the current values for each group (FIG. 3). The reason for grouping the motor current values and calculating the variance value in this way is as follows. Since comparison for each motor current value causes large unevenness, it is difficult to determine abnormality of the reduction gear on the basis of the motor current values. Accordingly, by grouping a plurality of motor current values and calculating the variance value thereof, it is possible to reduce an influence of unevenness of the motor current values and to more accurately ascertain the state of the reduction gear. The variance ratio calculating unit 3 divides the motor current values output from the current value detecting unit 2 into, for example, N groups (Group A, Group B, Group C, . . . ) in time series. In this embodiment, a user can set N to an arbitrary integer via an input unit such as a touch switch, a mouse, or a keyboard, but setting N to satisfy 5≤N is statistically preferable.

The variance ratio calculating unit 3 calculates variance ratios $F_{AN}$, $F_{BN}$, $F_{CN}$, . . . by dividing the variance values (standard deviation $\sigma=(variance)^{1/2}$) $\sigma^2_{AN}$, $\sigma^2_{BN}$, $\sigma^2_{CN}$, . . . of the motor current values of the groups by variance values $\sigma^2_{A1}$, $\sigma^2_{B1}$, $\sigma^2_{C1}$, . . . of reference current values. The reference current value is a motor current value when the reduction gear 102 is normal (a new product or a product which is ascertained to be normal on the basis of an iron concentration or the like). In advance, the robot 100 is made to perform the same operations as at the time of actual measurement, a motor current value is measured, and the measured value is stored as the reference current value in the memory 1b or the like. The variance ratio calculating unit 3 outputs the calculated variance ratio of each group to the determination unit 4.

The determination unit 4 is a specific example of the determination unit. The determination unit 4 calculates an abnormality ratio which is a ratio of the number of groups in which the variance ratio calculated by the variance ratio calculating unit 3 is equal to or greater than a variance threshold value to the number of groups (all groups) which are arranged in time series by the grouping. The determination unit 4 determines that the reduction gear 102 of the motor 101 is abnormal when the calculated abnormality ratio is equal to or greater than a predetermined ratio. For example, when the calculated ratio is equal or greater than a fixed ratio or equal to or greater by several % than the fixed ratio, the determination unit 4 may determine that the reduction gear 102 of the motor 101 is abnormal. The variance threshold value and the predetermined ratio are experimentally acquired, for example, as values when the reduction gear 102 is abnormal and are set in advance in the memory 1b. The variance threshold value and the predetermined ratio which have been set in the memory 1b once can be arbitrarily changed by a user using an input unit or the like. The abnormality determining device 1 performs the above-mentioned abnormality determination on the reduction gear 102 of each joint 103.

The report unit 5 is a specific example of the report unit. The report unit 5 reports the abnormality determination result to the user when the determination unit 4 determines that the reduction gear 102 is abnormal. For example, the report unit 5 outputs an alarm using a speaker, turns on or flickers an alarm lamp using a lighting device, or displays the abnormal reduction gear 102 using a display device. Accordingly, the user can easily recognize the abnormality of the reduction gear 102.

In the above-mentioned first embodiment, the variance ratio calculating unit 3 groups the time-series current values detected in time series by the current value detecting unit 2 at a predetermined time interval and calculates the variance value of the current values of each group. The variance ratio calculating unit 3 calculates the variance ratio of each group by dividing the variance value of the current values of each group by the variance value of the reference current value of the motor 101 when the reduction gear 102 is normal. The determination unit 4 determines that the reduction gear 102 is abnormal when the calculated variance ratio is equal to or greater than the threshold value. Accordingly, it is possible to group the current values acquired in time series and to accurately acquire abnormality of the reduction gear 102 using a simple statistical technique on the basis of the variance value of the current values for each group. As a result, it is possible to accurately determine abnormality of the reduction gear 102 of a motor for a robot without using a high-cost measuring device or a high-cost computing device.

Second Embodiment

In a second embodiment of the disclosure, the abnormality determining device 1 extracts groups in which an abnormality diagnosis condition that the robot 100 is in a high-load state is satisfied, excludes the extracted groups from the all the groups, calculates an abnormality ratio, and determines that the reduction gear 102 is abnormal when the calculated abnormality ratio is equal to or greater than a predetermined ratio. Accordingly, since the abnormality ratio can be calculated with high accuracy by excluding the groups when the robot is in the high-load state in which the motor current values are uneven, it is possible to further improve abnormality determination accuracy of the reduction gear 102. Alternatively, the abnormality determining device 1 extracts groups in which an abnormality diagnosis condition that the robot 100 is in a low-load state is satisfied, calculates the abnormality ratio using only the variance ratios of the extracted groups, and determines that the reduction gear 102 is abnormal when the calculated abnormality ratio is equal to or greater than a predetermined ratio. Accordingly, since the abnormality ratio can be calculated with high accuracy using only the groups when the robot is in the low-load state in which the motor current values are stable, it is possible to further improve the abnormality determination accuracy of the reduction gear 102.

(Abnormality Diagnosis Condition 1)

The motor 101 for the robot 100 is neither in a zero-point starting acceleration state (acceleration from a stopping state) nor in a zero-point stopping deceleration state (deceleration to a stopped state. In the zero-point starting acceleration state or the zero-point stopping deceleration state (a rapidly speed-changing state or a rapidly accelerating or decelerating state), the motor 101 for the robot 100 is in a high-load state. In this case, since unevenness occurs in the motor current values, the abnormality determination accuracy of the reduction gear 102 decreases.

In the second embodiment, at the same time as causing the current value detecting unit 2 to detect the motor current value, the rotation sensor 104 detects the rotational angular velocity of the motor 101 and outputs the detected rotational angular velocity to the determination unit 4. The determination unit 4 calculates an average value of the rotational angular velocities of the motor 101 for each group on the basis of the rotational angular velocity of the motor 101 detected by the rotation sensor 104. The determination unit 4 excludes groups in which the average value of the rotational angular velocities of the motor 101 is equal to or less than a predetermined velocity (the zero-point starting acceleration state or the zero-point stopping deceleration state) from all the groups and calculates the abnormality ratio.

Figure 4:
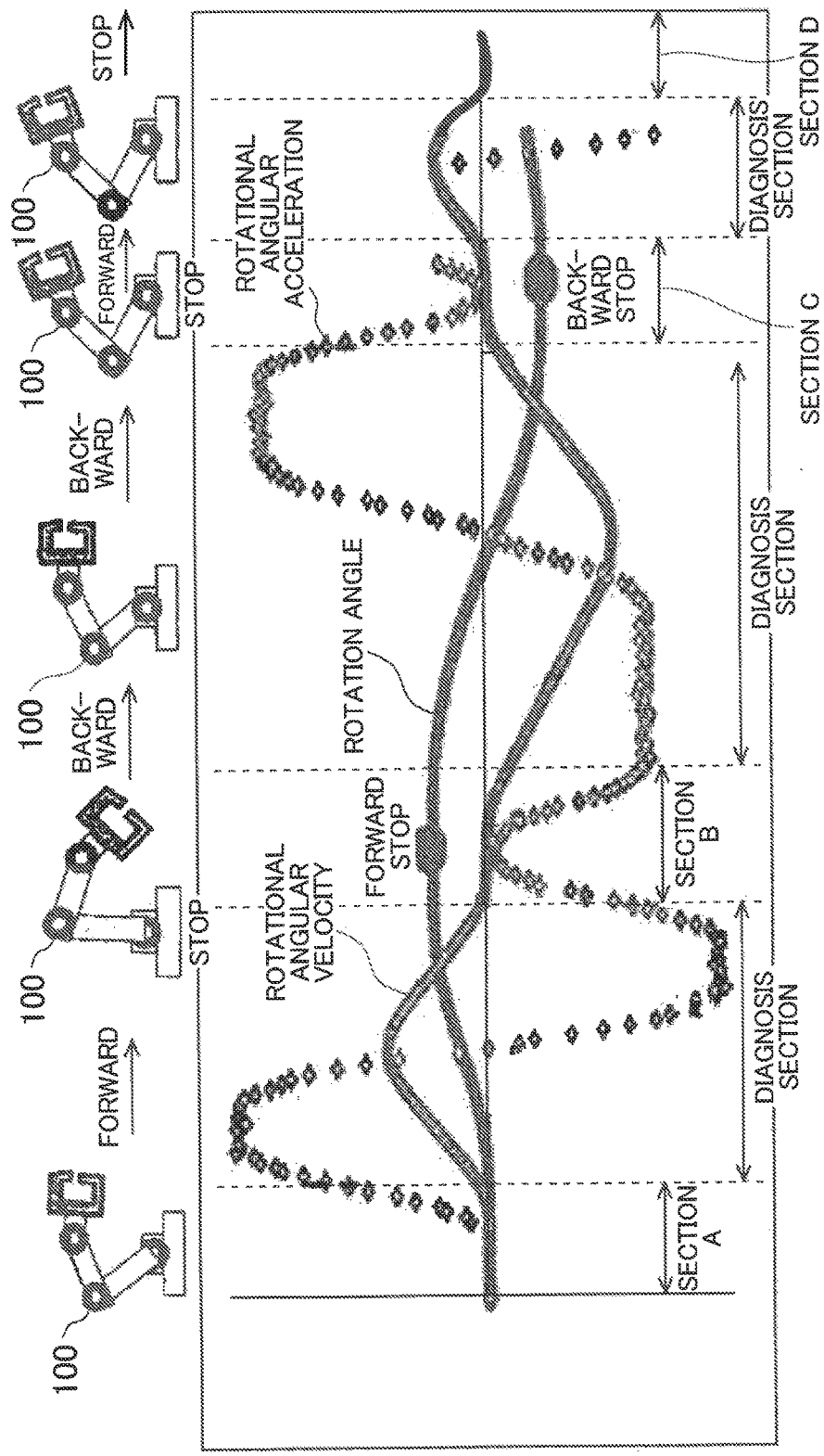
FIG. 4 is a diagram illustrating zero-point starting acceleration, zero-point stopping deceleration, and a diagnosis section.

For example, as illustrated in FIG. 4, when the robot 100 is made to move forward, stop, move backward, move backward, stop, move forward, and stop, the rotational angular velocity of the motor 101 is in the zero-point starting acceleration state in Section A, in the zero-point stopping deceleration state in Section B, in the zero-point starting acceleration state in Section C, and in the zero-point stopping deceleration state in Section D.

In this case, as illustrated in FIG. 5, in Groups 1 and 2 corresponding to Section A, Group 7 corresponding to Section B, Group 14 corresponding to Section C, and Groups 18 and 19 corresponding to Section D, the average value of the rotational angular velocities of the motor 101 is equal or less than the predetermined velocity. Accordingly, the determination unit 4 calculate the abnormality ratio using Groups 3 to 6, Groups 8 to 13, and Groups 15 to 17 (white parts) other than Groups 1, 2, 7, 14, 18, and 19 (hatched parts) in which the average value of the rotational angular velocities of the motor 101 is equal or less than the predetermined velocity from all Groups 1 to 19. That is, sections other than Sections A to D (Groups 1, 2, 7, 14, 18, and 19) are diagnosis sections (Groups 3 to 6, Groups 8 to 13, and Groups 15 to 17) in which abnormality determination is performed (FIGS. 4 and 5).

Figure 6:
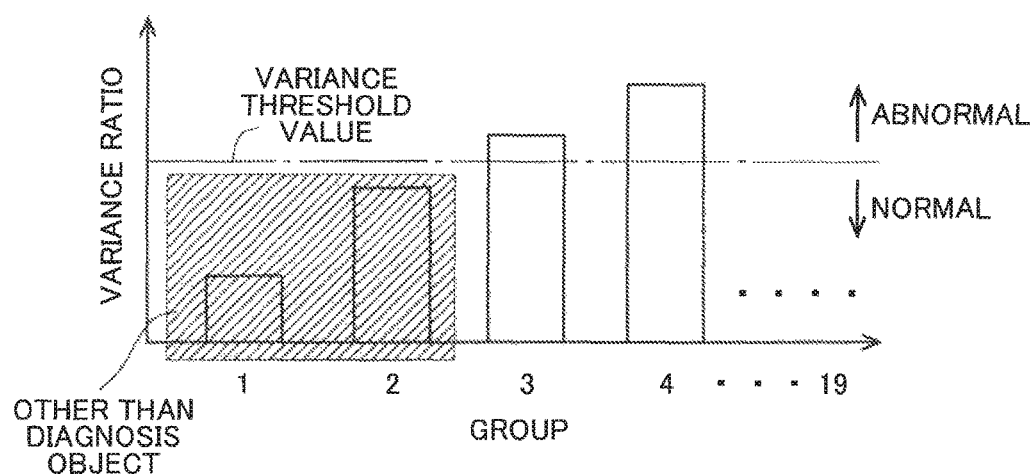
FIG. 6 is a diagram illustrating a method of calculating an abnormality ratio.

The determination unit 4 calculates the abnormality ratio which is the ratio of Groups 3, 4, . . . in which the variance ratio calculated by the variance ratio calculating unit 3 is equal to or greater than the variance threshold value using Groups 3, 4, . . . (white parts) which are left by excluding Groups 1, 2, . . . (hatched parts) other than the diagnosis objects in which the average value of the rotational angular velocities of the motor 101 is equal or less than the predetermined velocity in Groups 1 to 19, as illustrated in FIG. 6.

The determination unit 4 determines that the reduction gear 102 is abnormal when the calculated abnormality ratio is equal to or greater than the predetermined ratio. Accordingly, by excluding the groups before and after the motor stops (the zero-point starting acceleration state or the zero-point stopping deceleration state in which the average value of the velocities is equal to or less than the predetermined velocity) in which unevenness occurs in the motor current values, it is possible to calculate the abnormality ratio with high accuracy and to more accurately determine abnormality of the reduction gear 102 using the calculated abnormality ratio.

Regarding the predetermined velocity, for example, an average angular velocity in the zero-point starting acceleration state or the zero-point stopping deceleration state is calculated in advance and is set in the memory 1b or the like. The rotation sensor 104 is a specific example of the angular velocity detecting unit. The determination unit 4 calculates the average value of the angular velocities detected by the angular velocity detecting unit.

(Abnormality Diagnosis Condition 2)

The rotational angular velocity of the motor for the robot 100 is a fixed velocity or a variation thereof is less than a predetermined variation. In this state, the motor 101 for the robot 100 is in a low-load state. In this case, since the motor current values is not uneven but stable, it is possible to improve the abnormality determination accuracy of the reduction gear 102.

In the second embodiment, the determination unit 4 calculates a variation of the rotational angular velocity (a difference between a lowest rotational angular velocity and a highest rotational angular velocity) of the motor 101 in each group on the basis of the rotational angular velocity of the motor 101 detected by the rotation sensor 104. The determination unit 4 extracts groups in which the calculated variation of the rotational angular velocity of the motor 101 is equal to or less than a predetermined variation from all the groups. The determination unit 4 calculates an abnormality ratio using only the variance ratios of the extracted groups. The determination unit 4 determines that the reduction gear 102 is abnormal when the calculated abnormality ratio is equal to or greater than a predetermined ratio. Accordingly, it is possible to accurately calculate the abnormality ratio using only the groups in which the motor current values are stable and the rotational angular velocity of the motor 101 is fixed or the variation thereof is equal to or less than the predetermined variation and to more accurately determine abnormality of the reduction gear 102 using the abnormality ratio. Regarding the predetermined variation, for example, a variation of the rotational angular velocity when the motor 101 is in a low-load state is calculated in advance and set in the memory 1b or the like.

The determination unit 4 may extract the group in which the rotational angular velocity of the motor for the robot 100 is fixed or the variation thereof is equal to or less than the predetermined variation using a rotational angular acceleration of the motor 101 detected by the rotation sensor 104. For example, the determination unit 4 calculates an added value obtained by cumulatively adding the absolute value of the rotational angular acceleration of the motor 101 detected by the rotation sensor 104 for each group. The determination unit 4 extracts the group in which the calculated added value of the absolute values of the rotational angular acceleration of the motor 101 is equal to or less than a predetermined value from all the groups.

(Abnormality Diagnosis Condition 3)

When the rotation angle of the motor 101 (the joint 103) for the robot 100 is inside a predetermined angle range, a balancing force acts on the joint 103 and the rotating operation of the joint 103 is unlikely to be affected by gravity. In this state, the motor 101 for the robot 100 is in a low-load state.

For example, a gravitational moment acts on the joint 103 (two-axial or three-axial) rotating in a pitch direction due to the gravity of a link connected to the joint 103. The joint 103 is provided with a balancer 105 that generates a balancing force for balancing with the gravitational moment. The balancer 105 generates the balancing force, for example, using a spring force of a spring or a gas pressure of a cylinder or a piston. The balancer 105 generates a balancing force for returning the rotation angle to a neutral rotation angle when the rotation angle departs from the neutral rotation angle, where the neutral rotation angle being a rotation angle of the motor 101 (the joint 103) at a neutral point (a no-load state) at which the gravitational moment and the balancing force balance with each other. Accordingly, the motor 101 is in the low-load state within a predetermined angle range in which the rotation angle is unlikely to be affected by gravity from the neutral rotation angle.

In the second embodiment, the determination unit 4 extracts groups in which the rotation angle (the rotation angles in each group or an average value of the rotation angles in the group) of the motor 101 detected by the rotation sensor 104 is within a predetermined angle range. The determination unit 4 calculates an abnormality ratio using only the variance ratios of the extracted groups. The determination unit 4 determines that the reduction gear 102 is abnormal when the calculated abnormality ratio is equal to or greater than a predetermined ratio. Accordingly, it is possible to accurately calculate the abnormality ratio using only the groups in which a rotating operation of the joint 103 in the robot 100 including the joint 103 and the balancer 105 is unlikely to be affected by the gravity, the motor current values are stable, and the rotation angles of the motor 101 are within the predetermined angle range (in the vicinity of the neutral point of the balancer 105) and to more accurately determine abnormality of the reduction gear 102 using the abnormality ratio.

The determination unit 4 may calculate the abnormality ratio in arbitrary combination of (Abnormality Diagnosis Condition 1) to (Abnormality Diagnosis Condition 3) and may determine that the reduction gear 102 is abnormal when the calculated abnormality ratio is equal to or greater than the predetermined ratio. The abnormality of the reduction gear 102 may be determined using (Abnormality Diagnosis Condition 1), and it is preferable that the abnormality of the reduction gear 102 be determined in combination of (Abnormality Diagnosis Condition 1) with (Abnormality Diagnosis Condition 2) or (Abnormality Diagnosis Condition 3) when it is intended to more accurately determine abnormality of the reduction gear 102.

For example, the determination unit 4 may calculate the abnormality ratio in combination of (Abnormality Diagnosis Condition 1) and (Abnormality Diagnosis Condition 2) and may determine abnormality of the reduction gear 102. In this case, the determination unit 4 excludes groups in which the average value of the rotational angular velocities of the motor 101 is equal to or less than the predetermined velocity from all the groups and extracts groups in which the variation of the rotational angular velocity of the motor 101 is equal to or less than the predetermined variation from the excluded groups. The determination unit 4 calculates the abnormality ratio using only the variance ratios of the extracted groups. The determination unit 4 determines that the reduction gear 102 is abnormal when the calculated abnormality ratio is equal to or greater than the predetermined ratio. Accordingly, it is possible to accurately calculate the abnormality ratio and to more accurately determine abnormality of the reduction gear 102 using the abnormality ratio.

The determination unit 4 may calculate the abnormality ratio in combination of (Abnormality Diagnosis Condition 1) and (Abnormality Diagnosis Condition 3) and may determine abnormality of the reduction gear 102. In this case, the determination unit 4 excludes groups in which the average value of the rotational angular velocities of the motor 101 is equal to or less than the predetermined velocity from all the groups and extracts groups in which the rotation angle of the motor 101 detected by the rotation sensor 104 is within the predetermined angle range from the excluded groups. The determination unit 4 calculates the abnormality ratio using only the variance ratios of the extracted groups. The determination unit 4 determines that the reduction gear 102 is abnormal when the calculated abnormality ratio is equal to or greater than the predetermined ratio. Accordingly, it is possible to accurately calculate the abnormality ratio and to more accurately determine abnormality of the reduction gear 102 using the abnormality ratio.

The determination unit 4 may calculate the abnormality ratio in combination of (Abnormality Diagnosis Condition 1) to (Abnormality Diagnosis Condition 3) and may determine abnormality of the reduction gear 102. In this case, the determination unit 4 excludes groups in which the average value of the rotational angular velocities of the motor 101 is equal to or less than the predetermined velocity from all the groups and extracts groups in which the variation of the rotational angular velocity of the motor 101 is equal to or less than the predetermined variation from the excluded groups. The determination unit 4 extracts groups in which the rotation angle of the motor 101 detected by the rotation sensor 104 is within the predetermined angle range from the extracted groups. The determination unit 4 calculates the abnormality ratio using only the variance ratios of the extracted groups. The determination unit 4 determines that the reduction gear 102 is abnormal when the calculated abnormality ratio is equal to or greater than the predetermined ratio. Accordingly, in the above-mentioned proposal, it is possible to most accurately calculate the abnormality ratio and to most accurately determine abnormality of the reduction gear 102 using the abnormality ratio.

Figure 7:
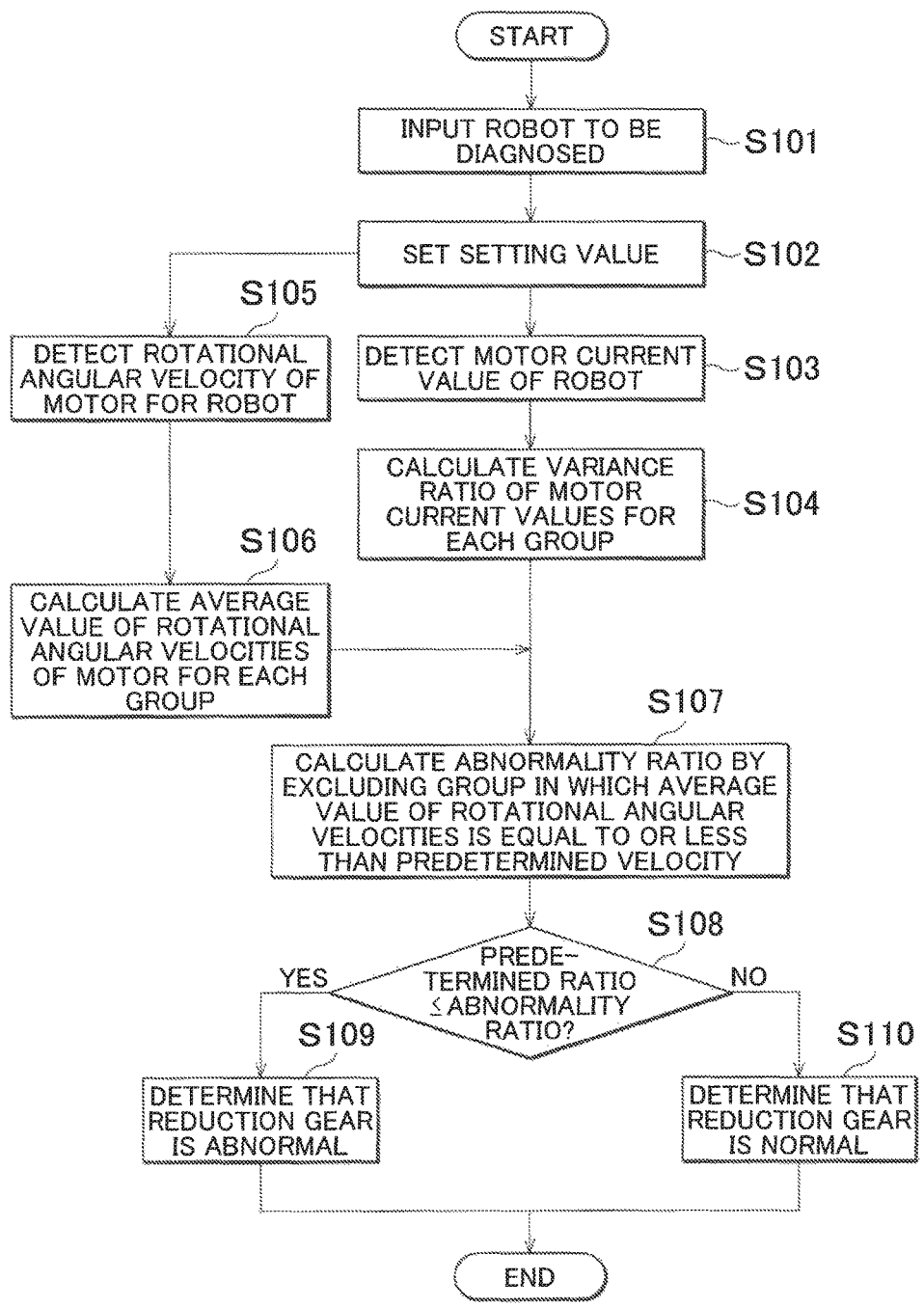
FIG. 7 is a flowchart illustrating a process flow of an abnormality determining method according to the second embodiment.

FIG. 7 is a flowchart illustrating a processing flow of an abnormality determining method according to the second embodiment. A robot 100 to be diagnosed is input to the abnormality determining device 1 (Step S101). For example, a plurality of robots 100 are displayed on a display screen of the abnormality determining device 1 and a user can select an arbitrary robot among the displayed robots via an input unit or the like.

In the abnormality determining device 1, setting values such as the number of motor current values N for each group, a variance threshold value, a predetermined ratio, and a predetermined velocity are set via the input unit or the like (Step S102).

The current value detecting unit 2 detects a motor current value of the robot 100 and outputs the detected motor current value to the variance ratio calculating unit 3 (Step S103). The variance ratio calculating unit 3 groups the time-series motor current values output from the current value detecting unit 2 for every N groups which have been set, calculates a variance ratio by dividing the variance value of the motor current values for each group by a variance value of a reference current value, and outputs the calculated variance ratio to the determination unit 4 (Step S104).

At the same time as causing the current value detecting unit 2 to detect the motor current value, the rotation sensor 104 detects a rotational angular velocity of the motor 101 for robot 100 and outputs the detected rotational angular velocity to the determination unit 4 (Step S105). The determination unit 4 calculates an average value of the rotational angular velocities of the motor 101 for each group on the basis of the rotational angular velocity of the motor 101 detected by the rotation sensor 104 (Step S106).

The determination unit 4 excludes groups in which the average value of the rotational angular velocities of the motor 101 is equal to or less than the predetermined velocity from all the groups on the basis of the variance ratios of the groups calculated by the variance ratio calculating unit 3 and calculates the abnormality ratio (Step S107). The determination unit 4 determines whether the calculated abnormality ratio is equal to or less than the predetermined ratio (Step S108).

When the calculated abnormality ratio is equal to or greater than the predetermined ratio (YES in Step S108), the determination unit 4 determines that the reduction gear 102 is abnormal (Step S109). On the other hand, when the calculated abnormality ratio is less than the predetermined ratio (NO in Step S108), the determination unit 4 determines that the reduction gear 102 is normal (Step S110). The abnormality determining device 1 repeatedly performs the processes of (Step S103) to (Step S110) on the reduction gear 102 of each joint 103.

Figure 8:
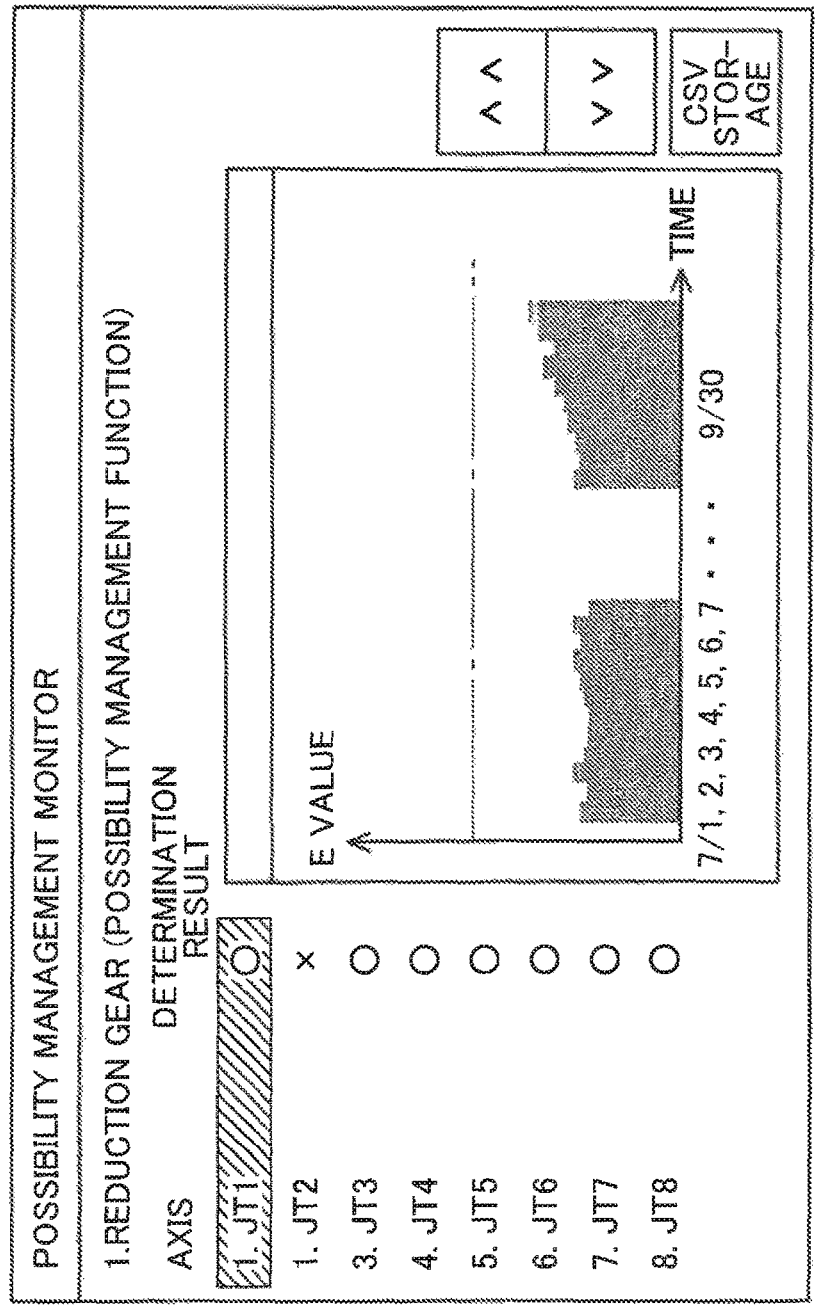
FIG. 8 is a diagram illustrating an example of an abnormality determination result.
Figure 9:
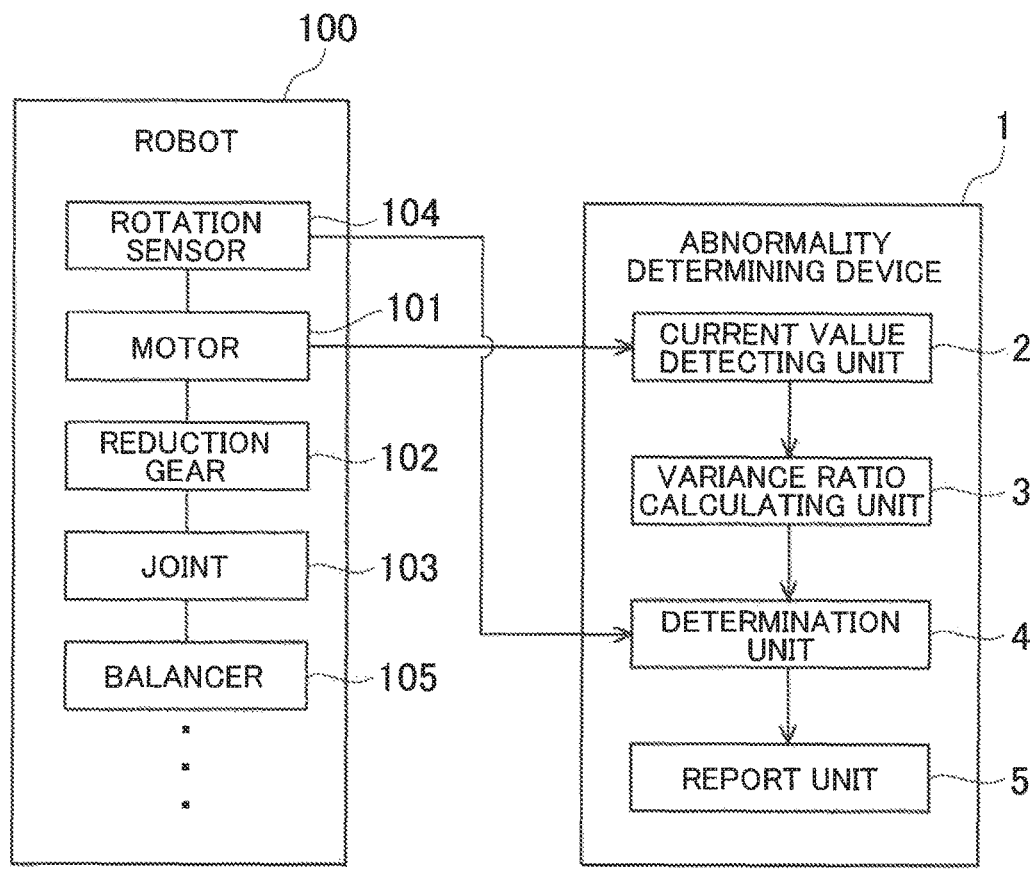
FIG. 9 is a block diagram illustrating a schematic system configuration of an abnormality determining device according to the second embodiment.

The report unit 5 reports the abnormality determination result to the user when the determination unit 4 determines that the reduction gear 102 is abnormal. For example, as illustrated in FIG. 8, the report unit 5 displays reduction gears 102 which are abnormal and normal using a display device. In this case, the user can easily recognize that since the determination result of a two-axial joint JT2 is "x," the reduction gear 102 thereof is abnormal and that since the determination results of a single-axial joint JT1 and three-axial to eight-axial joints JT3 to JT8 are "o," the reduction gears 102 thereof are normal. The report unit 5 may report the abnormality determination result to another terminal (PC) via a communication network (such as a LAN or the Internet). Accordingly, a person holding the abnormality determination result or the like can remotely recognize abnormality of the reduction gear 102.

The disclosure is not limited to the above-mentioned embodiments and can be appropriately modified without departing from the gist of the disclosure. In the above-mentioned embodiments, the determination unit 4 may determine the calculated abnormality ratio in a stepwise manner. For example, the determination unit 4 may determine that there is a possibility that the reduction gear 102 of the motor 101 will be abnormal (a possibility that the reduction gear is not abnormal but is aging and will be abnormal in the near future) when the calculated abnormality ratio is equal to or greater than a first predetermined ratio, and may determine that the reduction gear 102 of the motor 101 is abnormal when the calculated abnormality ratio is equal to or greater than a second predetermined ratio (second predetermined ratio>first predetermined ratio). In this case, for example, using the display device, the report unit 5 may mark an abnormal reduction gear 102 with "x," mark a reduction gear 102 having a possibility of abnormality with "Δ," and mark a normal reduction gear 102 with "o." Accordingly, an operator or the like can easily understand a reduction gear 102 having a possibility of abnormality in the near future as well as a reduction gear 102 that is currently abnormal. The first and second predetermined ratios are set, for example, in the memory 1b in advance and the setting can be changed using an input unit or the like.

In the disclosure, for example, the processing flow illustrated in FIG. 7 may be embodied by causing the CPU 1a to execute a computer program. The program can be stored and supplied to a computer using various types of non-transitory computer-readable mediums. The non-transitory computer-readable medium includes various types of tangible storage mediums. Examples of the non-transitory computer-readable medium include a magnetic storage medium (such as a flexible disk, a magnetic tape, and a hard disk drive), a magneto-optical storage medium (such as a magneto-optical disk), a CD-ROM (Read Only Memory), a CD-R, a CD-R/W, and a semiconductor memory (such as a mask ROM, a programmable ROM (PROM), an erasable PROM (EPROM), a flash ROM, or a random access memory (RAM)).

The program may be supplied to the computer using various types of transitory computer-readable mediums. Examples of the transitory computer-readable medium include electrical signals, optical signals, or electromagnetic waves. The transitory computer-readable medium can supply the program to the computer via a wired communication line such as an electrical wire and an optical fiber or a wireless communication line.

What is claimed is:

1. An abnormality determining device that determines abnormality of a reduction gear of a motor for a robot including: a jointed arm having a joint rotating in a pitch direction that is driven by the motor via the reduction gear, and a balancer provided to the joint, the balancer being configured to generate a balancing force for balancing a gravitational moment acting on the joint, the abnormality determining device comprising:
    a processor programmed to:
        detect a current value which is a value of a drive current of the motor;
        group time-series current values detected in time series at a predetermined time interval of greater than 10 ms, to calculate a variance value of the current values of each group, and to calculate a variance ratio of each group by dividing the variance value of the current values of a corresponding group by a variance value of a reference current value of the motor when the reduction gear is new;
        detect a rotational angular velocity of the motor;
        detect a rotation angle of the motor;
        determine that the reduction gear is abnormal when the calculated variance ratio is equal to or greater than a threshold value;
        calculate a variation of rotational angular velocities corresponding to the current values of the motor in the groups based on the detected rotational angular velocity of the motor;
        extract groups in which a calculated variation of the rotational angular velocities of the motor is equal to or less than a predetermined variation from the groups;
        extract groups in which all the rotation angles corresponding to the current values belonging to each group are within a predetermined angle range centered on a neutral rotation angle at which the gravitational moment balances with the balancing force;
        calculate an abnormality ratio which is a ratio of a number of groups in which the variance ratio is equal to or greater than the threshold value to a number of groups using only the variance ratios of the extracted groups;
        determine that the reduction gear is abnormal when the calculated abnormality ratio is equal to or greater than a predetermined ratio; and
        when it is determined that the reduction gear is abnormal, issue a report that the reduction gear is abnormal.

2. The abnormality determining device according to claim 1, wherein the processor is programmed to:
    calculate an average value of the rotational angular velocities corresponding to the current values of the motor in the groups based on the detected rotational angular velocity of the motor;

exclude groups in which a calculated average value of the rotational angular velocities of the motor is equal to or less than a predetermined velocity from the groups;
calculate the abnormality ratio; and
determine that the reduction gear is abnormal when the calculated abnormality ratio is equal to or greater than the predetermined ratio.

3. The abnormality determining device according to claim 1, wherein the report is issued to a user.

4. An abnormality determining method of determining abnormality of a reduction gear of a motor for a robot including: a jointed arm having a joint rotating in a pitch direction that is driven by the motor via the reduction gear, and a balancer provided to the joint, the balancer being configured to generate a balancing force for balancing a gravitational moment acting on the joint, the abnormality determining method comprising:
detecting a current value which is a value of a drive current of the motor;
grouping detected time-series current values at a predetermined time interval of greater than 10 ms;
calculating a variance value of the current values of each group;
calculating a variance ratio of the current values of each group by dividing the variance value of the current values of a corresponding group by a variance value of a reference current value of the motor when the reduction gear is new;
detecting a rotational angular velocity of the motor;
detecting a rotation angle of the motor;
determining that the reduction gear is abnormal when a calculated variance ratio is equal to or greater than a threshold value;
calculating a variation of rotational angular velocities corresponding to the current values of the motor in the groups based on the detected rotational angular velocity of the motor;
extracting groups in which a calculated variation of the rotational angular velocities of the motor is equal to or less than a predetermined variation from the groups;
extracting groups in which all the rotation angles corresponding to the current values belonging to each group are within a predetermined angle range centered on a neutral rotation angle at which the gravitational moment balances with the balancing force;
calculating an abnormality ratio which is a ratio of a number of groups in which the variance ratio is equal to or greater than the threshold value to the number of groups using only the variance ratios of the extracted groups;
determining that the reduction gear is abnormal when the calculated abnormality ratio is equal to or greater than a predetermined ratio; and
when it is determined that the reduction gear is abnormal, issuing a report that the reduction gear is abnormal.

* * * * *